United States Patent [19]

Kimzey

[11] 4,339,147
[45] Jul. 13, 1982

[54] EQUINE AMBULANCE

[76] Inventor: John S. Kimzey, P.O. Box 1001, Woodland, Calif. 95695

[21] Appl. No.: 203,728

[22] Filed: Nov. 3, 1980

[51] Int. Cl.³ .............................................. B60P 3/32
[52] U.S. Cl. .................................. 296/24 C; 119/11; 414/469; 296/146
[58] Field of Search ................. 296/24 C; 280/414 R, 280/43, 43.17, 43.18, 43.23, 43.24; 414/482, 469, 474; 119/7, 11, 20

[56] References Cited

U.S. PATENT DOCUMENTS

| | | | |
|---|---|---|---|
| 718,840 | 1/1903 | Herschmann | 119/11 |
| 3,574,388 | 4/1971 | Stone | 296/24 C |
| 3,741,529 | 6/1973 | Blagg | 296/24 C |
| 4,168,933 | 9/1979 | Kane | 296/24 C |
| 4,260,315 | 4/1981 | Bouffard | 414/469 |

FOREIGN PATENT DOCUMENTS 446032 12/1913 France .............................. 296/24 C Primary Examiner—Robert R. Song
Attorney, Agent, or Firm—Lothrop & West

[57] ABSTRACT

An ambulance for the transport of sick or injured horses. The rear portion of the ambulance housing is selectively lowered into an inclined, ground engaging position for animal loading and unloading, and selectively raised into a standard, horizontal position for transport. A vertical partition, or press wall, within the housing is movable into selective positions for lateral support and confinement of the loaded animal. Angled unloading ramps provide a gradually inclined walkway for animal exit through either side of the lowered ambulance housing. A winch and cable assembly allows a thoroughly disabled animal to be dragged upon a "flexible pallet" into the ambulance in its lowered position.

10 Claims, 6 Drawing Figures

EQUINE AMBULANCE

BACKGROUND OF THE INVENTION

1. Field of the Invention

The invention relates generally to ambulance trailers or housings for transporting horses, or other stock animals.

More specifically, an equine ambulance trailer including a selectively positionable partition or press wall for confining a sick or injured horse is disclosed. The invention further relates to means for selectively lowering the trailer floor into a gradual, inclined engagement with the ground to facilitate easy entry or exit for the animal, and means for selectively raising the inclined trailer floor into a horizontal attitude for transport.

2. Prior Art

The transport of an injured or sick horse poses particular problems not easily handled by a conventional horse trailer. The injured or sick animal is usually disabled and experiencing pain, and therefore frightened at the prospect of walking upon a long and substantially inclined ramp for trailer entry and exit. A horse trailer whose floor could be selectively lowered to the ground for entry or exit, and then returned to a normal height and aspect for transport would make loading and unloading a much safer and less traumatic experience for the horse.

The prior art does show a horse trailer which can be raised and lowered to achieve the objectives just outlined. U.S. Pat. No. 3,574,388, issued to Stone, discloses a wheel retracting and extending mechanism (see FIGS. 10 and 11) for use with a horse trailer. This design, however, is directed towards raising and lowering the entire trailer rather than just the rear portion of the trailer, as in the present design. The Stone design further requires an elaborate towing hitch assembly to allow unimpeded vertical adjustment between the hitch and the frame during raising and lowering operations. In short, the Stone design is unnecessarily complicated in structure, and expensive to manufacture.

Once the animal has been loaded into the trailer, an injury could either be sustained or aggravated during travel if the animal is not properly confined. Heretofore, a cumbersome and awkward girth sling has been placed around the animal and then attached to a hitch, thereby restricting the animal's movement within the trailer. The present invention includes an actuated partition, or press wall, offering a convenient and effective means for laterally confining and securing the animal during transit without the use of such slings.

U.S. Pat. No. 3,053,224 issued to Pierce illustrates a removable partition 76 in a horse trailer assemblage (see FIG. 6). The partition in Pierce is manually positionable, merely to form a funnel shaped entryway for loading horses. The partition 76, as disclosed in the Pierce patent, cannot confine the horse laterally, nor is it capable of linear, transverse translation within the trailer, in contrast to the actuated partition of the preferred embodiment as disclosed herein.

SUMMARY OF THE INVENTION

The invention is designed primarily to facilitate the safe transport of sick or injured animals within a towed trailer, or the like. The rear of the ambulance, or transport trailer, can be selectively lowered into conjunction with the ground, allowing animal loading directly onto the floor of the trailer. In other words, the temporarily inclined trailer floor rests upon the ground to function as an animal loading ramp.

The trailer includes a movable, internal press wall, or partition, used for lateral confinement and support of the animal. Before loading, an operator shifts the movable wall into either of its extreme lateral positions, into close relation with the cojacent trailer wall. The entering animal is thus presented with a single, wide compartment, rather than the dual, narrow compartments found in many standard horse trailers. Animal confusion and apprehension as to which compartment to enter are thereby avoided.

Once the animal has been loaded, the movable press wall is activated to intrude slowly upon the animal. The wall's gradual encroachment is helpful not only to give the animal time for adjusting to the restricting quarters, but also to afford the operator a nice degree of control over the partition's eventual placement. Both the trailer walls and the movable partition are well padded to ensure comfortable, but secure confinement of the animal. The padded rear, or aft doors are then closed, and the rear of the trailer is raised, placing the floor into a level, or horizontal position for transit.

During transport, the confined animal is supported in an upright position between the fixed wall and the partition, and is thereby prevented from making potentially injurious movements. After arrival, the operator again actuates the controls, effecting slow withdrawal of the partition. After the rear of the trailer is again lowered, the animal is unloaded either through one of the fore positioned side doors, or through the aft doors.

It is an object, therefore to provide a generally improved ambulance, or trailer, for the transport of sick or injured animals.

It is another object to provide an animal trailer having simplified means for selectively lowering and raising the rear body portion of the trailer, to facilitate animal loading, transport, and unloading operations.

It is yet another object to provide an actuated, selectively positionable wall or partition within an animal transport trailer, for lateral support and confinement of the subject animal.

These and other objects will become evident from the illustrations in the drawings and from the discussion contained in the detailed description of the preferred embodiment, to follow.

DETAILED DESCRIPTION OF THE PREFERRED EMBODIMENT

Figure 1:
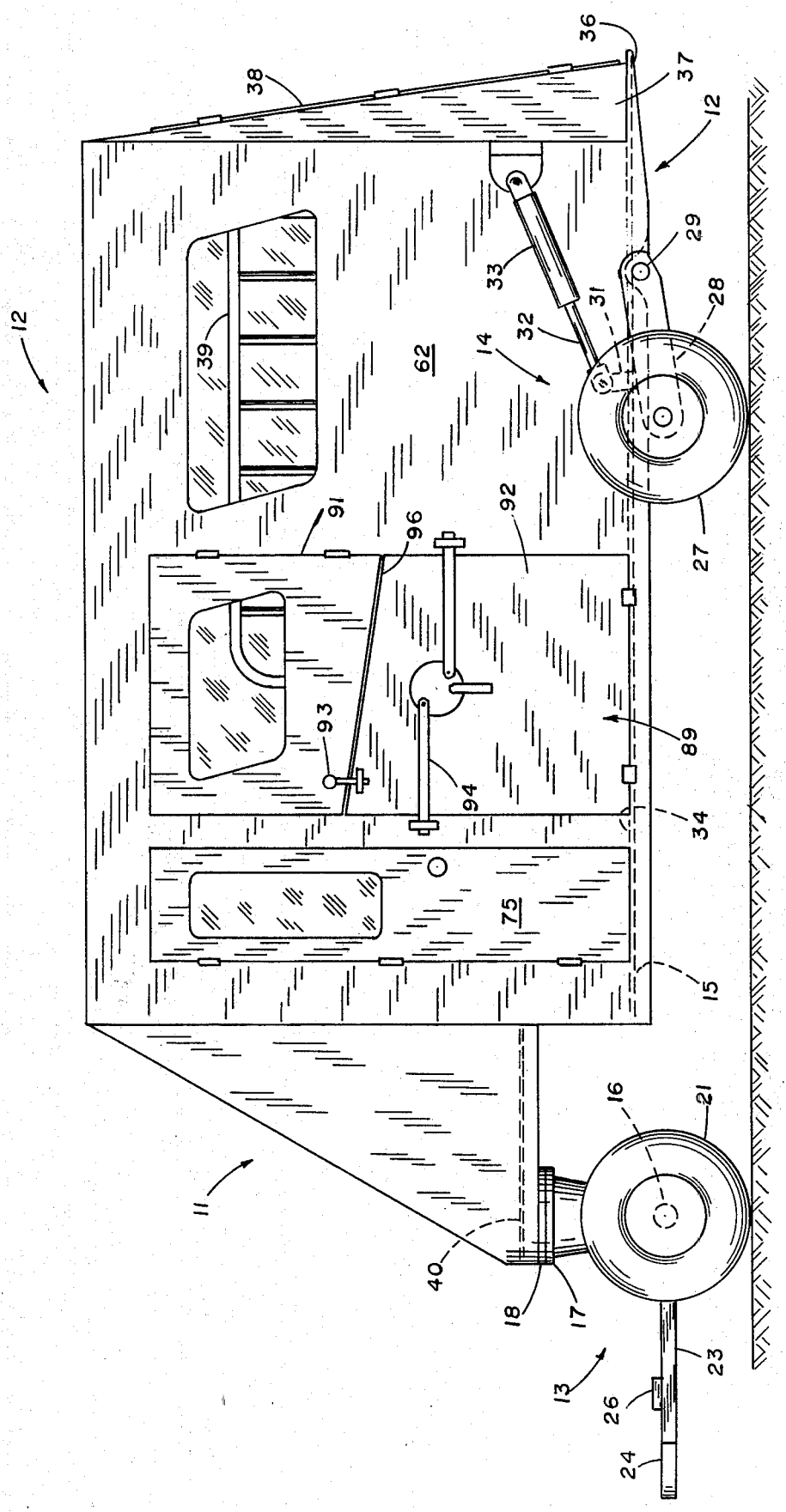
FIG. 1 is a side elevational view, with the ambulance in a level, or raised position for transport.

An equine ambulance pursuant to the invention 11 generally comprises an elongated trailer housing 12, supported by a front wheel assembly 13 and a rear wheel assembly 14 attached to an elongated chassis 15, or frame. The front wheel assembly 13 includes a transverse front axle 16, pivotally connected at its center portion to a conventional vertical "fifth wheel" support post 17 (see FIG. 3). The support post 17 includes an upper pivot 18, movable about a vertical axis, and a lower pivot 19, movable about a fore and aft horizontal axis, to accommodate for yaw and roll, respectively, between the front axle 16 and the housing 12 as the ambulance 11 is towed.

a pair of front wheels 21 is rotatably mounted to the end extremities of the front axle 16, and a transverse tube 22 is attached, at its end extremities, to the fore portion of the axle 16 by the pivots 25. A pair of forwardly converging angle braces 23 extends from the transverse tube 22 and secures the draw bar 24. The transverse plate 26 further strengthens the draw bar and angle brace assemblage, as is seen most clearly in FIGS. 2 and 4. A tractor, or other appropriate towing vehicle, (not shown) is attached to the fore end of the draw bar 24 using a conventional coupler.

The rear wheel assembly 14 includes a pair of rear wheels 27, rotatably mounted to the fore extremity of a respective lever 28 (see FIG. 1). The aft extremity of each lever 28 is pivotally mounted to a fixed rear axle 29, extending transversely under the trailer housing 12 (see FIGS. 1 and 2). A lever extension 31 projects upwardly from each lever 28, and is pivotally interconnected to the rod 32 of a respective hydraulic ram 33.

With the invention 11 in a level, or raised position for transport, the rear wheel assembly 14 assumes a first, extended position, as can best be seen in FIG. 1. In this raised position, the protruding rods 32 urge the extensions 31 downwardly, maintaining the rear wheel supporting levers 28 and the floor 34, or base, of the housing 12, in a generally horizontal orientation.

After the invention 11 has been towed to the desired location for animal loading, several preparatory steps must be undertaken before actual loading commences. Initially, the operator actuates the rams 33 to retract the rods 32, in effect, lowering the after end of the trailer housing 12 towards the subjacent ground. As the rear wheel assembly 14 assumes a second, retracted position (see FIG. 3), the floor 34 of the housing 12 is placed into an inclined, or lowered position for loading. During the lowering operation, the housing 12 freely rotates about the front wheels 21, and the pivots 25 allow the front axle 16 to rotate with the lowering housing 12 without inclining the draw bar 24 from its normal horizontal position.

Figure 3:
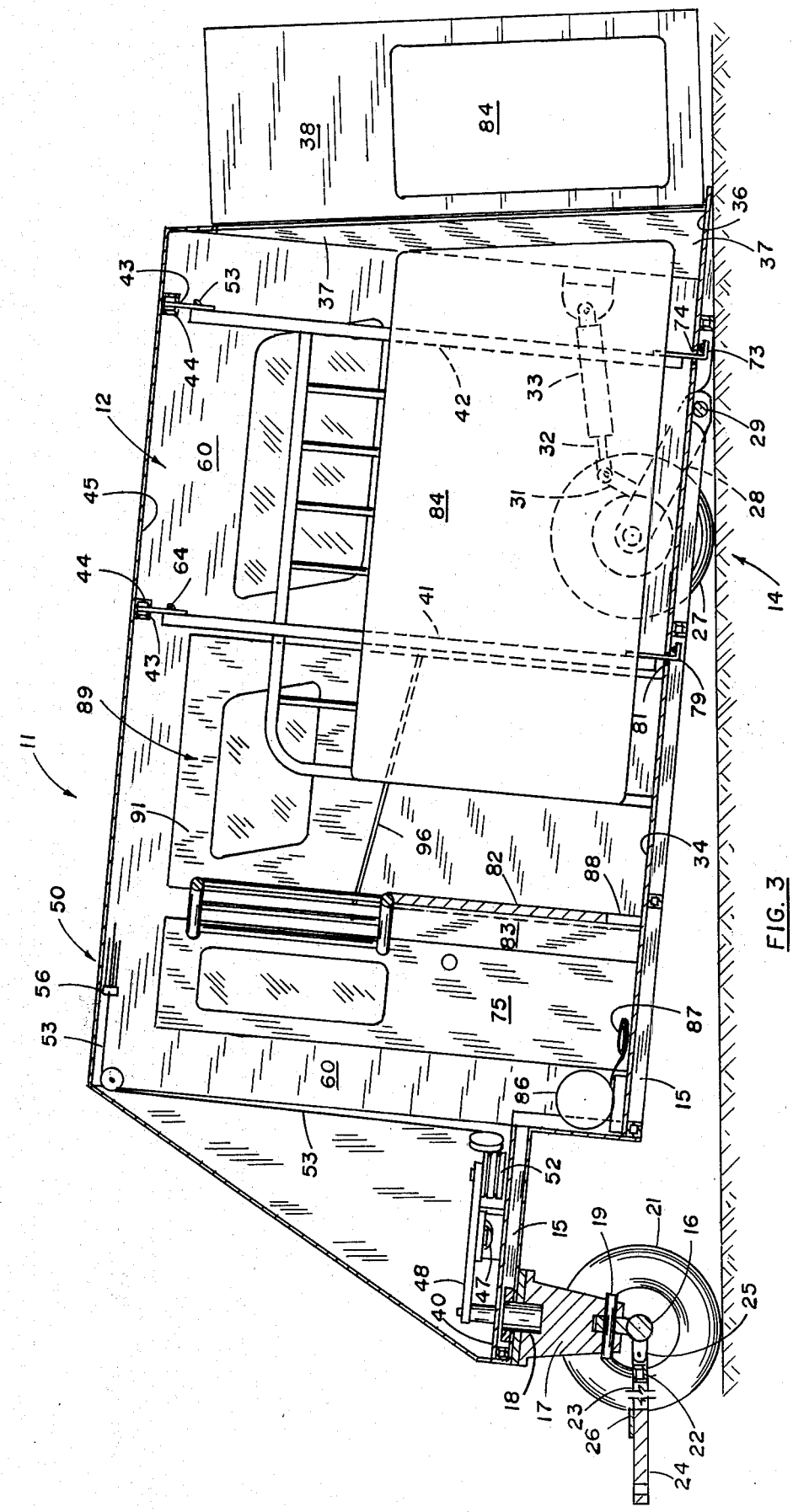
FIG. 3 is a median, longitudinal, cross sectional view of the ambulance shown in an inclined, or lowered position for loading.

With the floor 34 in a fully inclined position, the rearward edge of the short floor extension 36 rests upon the ground (see FIG. 3). As a result, a very sturdy and gradually inclined "ramp" is created by the lowered floor 34 and the coplanar floor extension 36. The necessity of a steep, and often unstable, supplemental loading ramp is thereby obviated.

Figure 2:
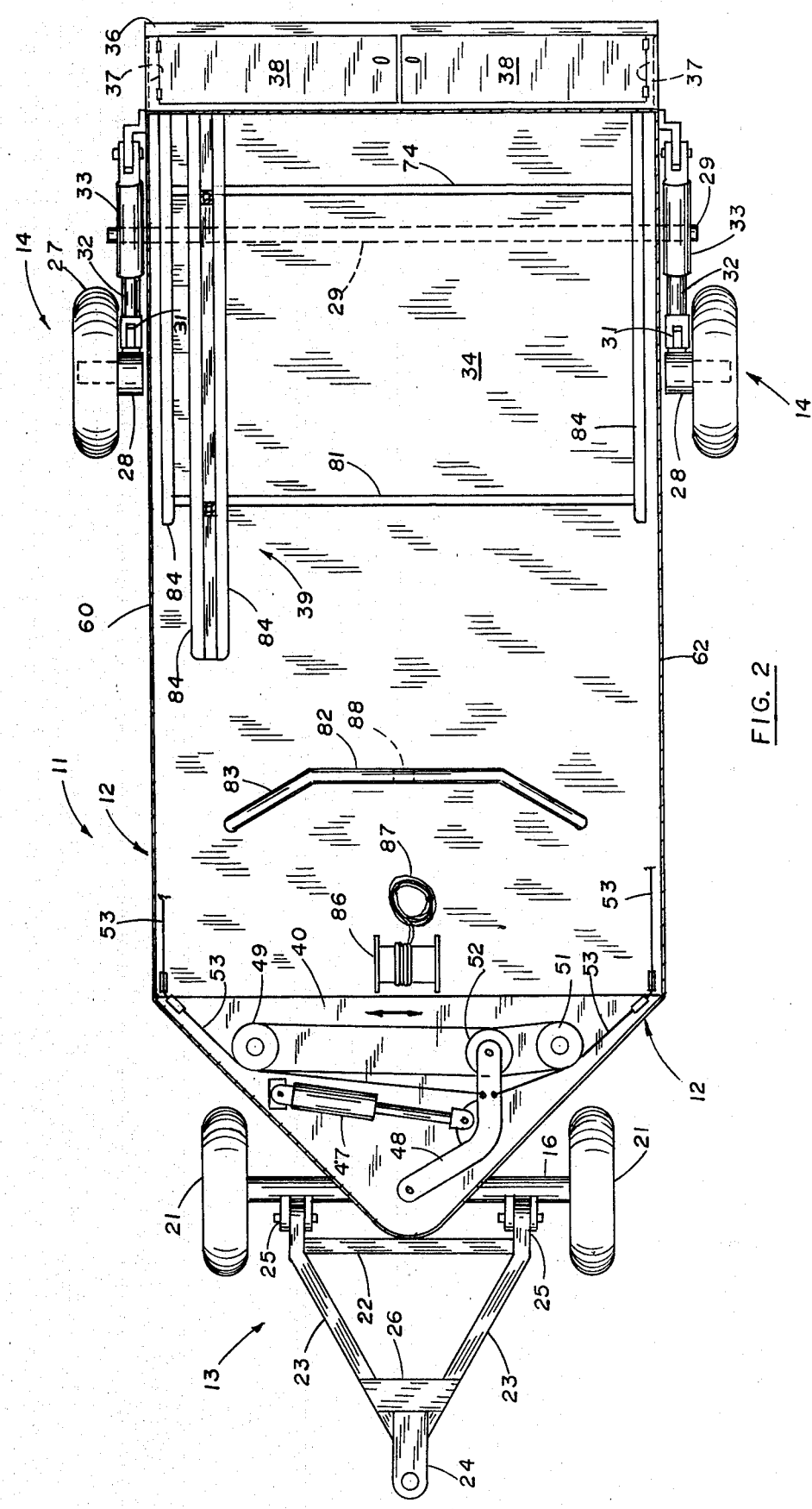
FIG. 2 is a top plan view with the roof and angled front portions of the ambulance removed, showing the movable partition in an extreme lateral position for animal loading.

Triangular wall panels 37 are attached to respective lateral extremities of the floor extension 36 (see FIGS. 1 and 2). Rear, or after doors 38 are hingeably attached to the downwardly inclined edge of the wall panels 37, completing the wedge-shaped, rearward extension of the housing 12. The rear doors 38, then, are mounted at an inclination offset from the vertical, as is most clearly shown in FIG. 1. This angular offset from the vertical is at least as great as the angular offset from the horizontal which the floor 34 assumes in its lowered position. Consequently, when the floor 34 is placed into an inclined position for animal loading, the rear doors 38 can be opened freely without being obstructed by the ground (see FIG. 3).

Making reference to FIGS. 2, 3, 4 and 5, a movable vertical partition 39, or press wall, is longitudinally positioned within the housing 12. In a manner to be discussed at considerable length herein, the partition 39 can be actuated into side to side, transverse translation for selective placement.

The press wall 39 includes a vertical forward support bar 41 and a vertical after support bar 42. A roller 43 is attached to the upper end of each support bar 41 and 42, and each roller 43 engages a respective, transversely positioned channel 44 (see FIGS. 3 and 5), or track. Each channel 44, in turn, depends from the ceiling 45 of the housing 12. The partition 39 is thereby suspended for transverse movement, while at all times maintaining longitudinal, fore and aft parallelism with the side walls of the trailer housing 12.

Figure 5:
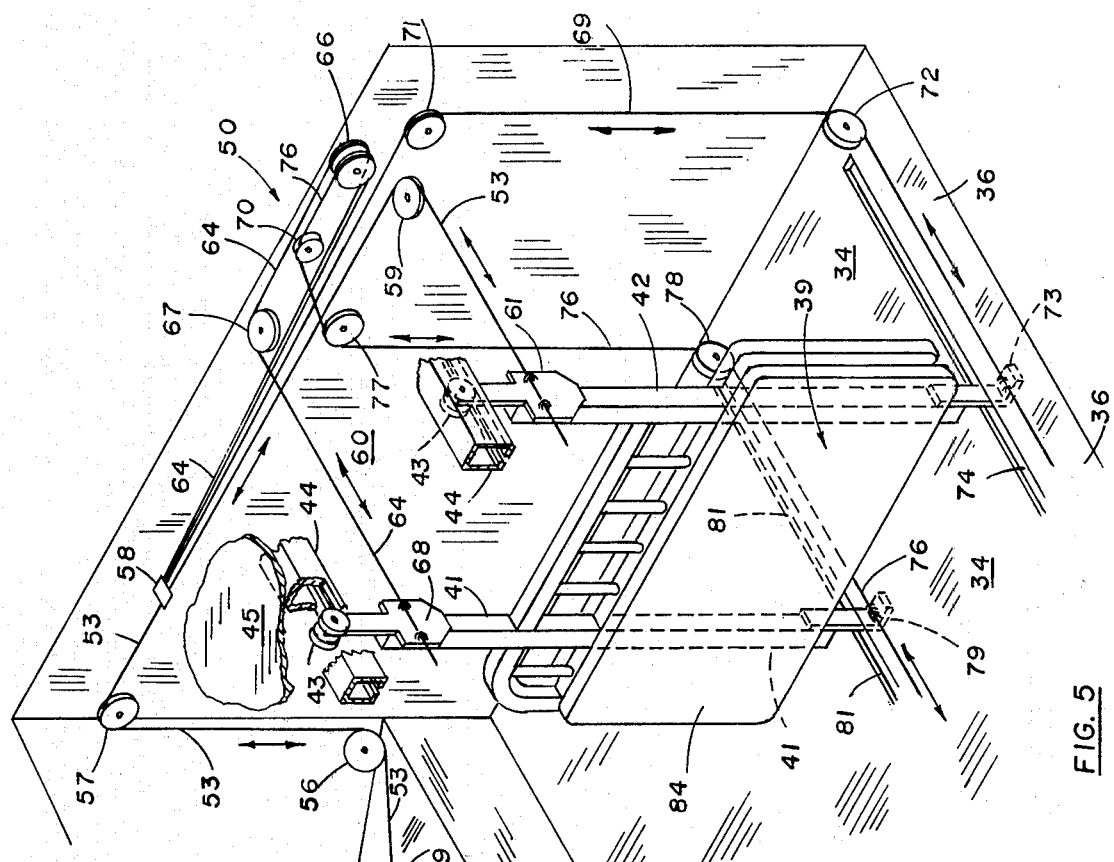
FIG. 5 is a fragmentary, perspective, pictorial representation of the support and drive systems for the movable partition, showing the hydraulic ram and cooperating sheaves interconnected to one half of the bi-laterally symmetrical cable drive linkage; and, FIG. 6 is a cross-sectional view of the floor of the ambulance, taken to an expanded scale, showing the drive cable clamped to the drive foot of the movable partition.

Linear motion is imparted to the partition 39 by the four point application of coincident force upon the support bars 41 and 42. FIG. 5 most clearly illustrates the structure and interlinkage of a cable drive assembly 46 and a plurality of drive cables 50 which cooperate to actuate the partition 39.

The cable drive assembly 46 includes a hydraulic ram 47 pivotally mounted on the upper frame 40 of the trailer, the ram 47 being pivotally interconnected to a drive arm 48, or lever, also pivotally mounted on the upper frame member 40. The cable drive assembly 46 further includes two sheaves 49 and 51, rotatably mounted on the frame 40, and a central sheave 52, rotatably mounted on the movable extremity of the drive arm 48 and movable therewith. The sheaves 49, 51 and 52 are all of the double grooved variety.

Since the configuration of the drive cables 50 is substantially bilaterally symmetrical on either side of the housing 12, the illustration of the portion shown in FIG. 5 serves adequately to disclose the complete structure of the drive cable system. It should also be noted that the drive cables 50 and associated pulleys and sheaves have been largely eliminated from the other figures for the sake of clarity.

Figure 4:
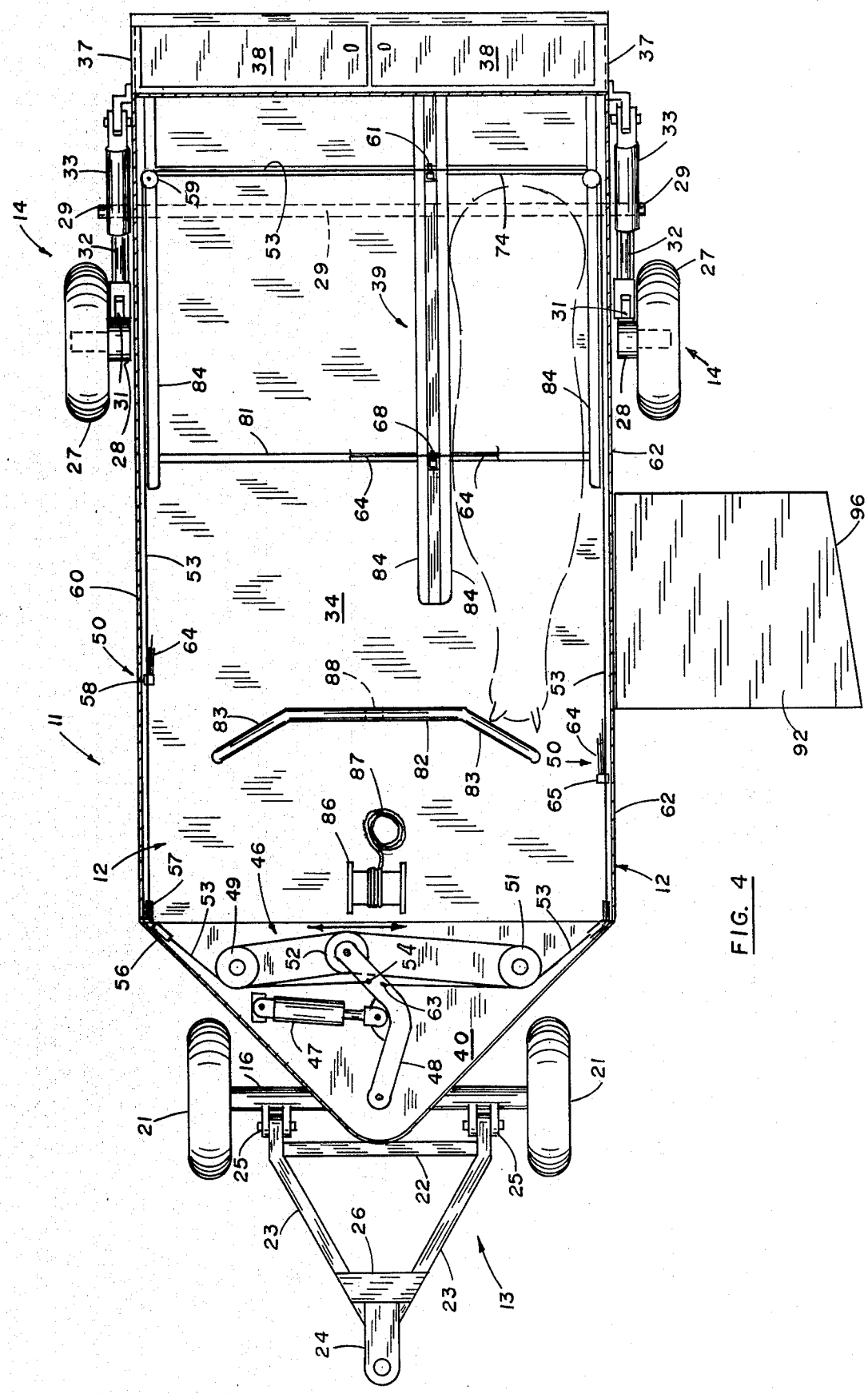
FIG. 4 is a view similar to FIG. 2, but with the movable partition shifted to confine and support laterally, the loaded animal shown in outline, and with one of the lateral doors lowered to the ground for animal unloading.

The main drive cable 53 begins its circuitous route by passing from a first attachment point 54 on the upper surface of the arm 48, extending laterally to an upper groove in the lateral sheave 49, then inwardly toward a lower groove in the central sheave 52, and then laterally again through a lower groove in the lateral sheave 49 before engaging direction changing pulleys 56 and 57 and interconnecting to the remainder of the partition drive cables 50 at a clamp 58, (see FIGS. 3 and 5). The main drive cable 53 then continues rearwardly along the right lateral wall 60 past the clamp 58, and around the pulley 59, to a rear drive plate 61 mounted on the upper portion of the vertical after support bar 42. The main drive cable 53 then passes forwardly along the left lateral wall 62 through a cable path and pulley combination which is a mirror image of that just described before returning to a second attachment point 63 upon the arm 48. FIG. 4 illustrates the complete path of the main drive cable 53 in plan.

As most clearly appears in FIG. 5, an upper, front drive cable 64 extends rearwardly from the clamp 58 to a dual pulley 66, and then forwardly past a direction changing pulley 67, to a front drive plate 68 mounted on the upper portion of the vertical forward support bar 41. The upper front drive cable 64 then continues to the left lateral wall 62 and proceeds through a cable path and pulley combination in mirror symmetry to that just described, terminating at a clamp 65 attached to the main drive cable 53 (see FIG. 4).

Figure 6:
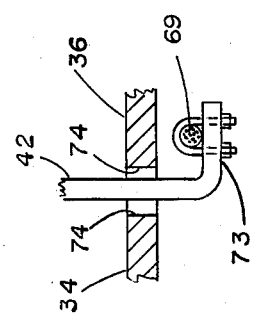

A lower, rear drive cable 69 similarly extends rearwardly from the clamp 58 and passes over direction changing pulleys 71 and 72 with its transverse run secured to a rear foot 73 at the lowermost end of the after support bar 42. As is shown most clearly in FIG. 6, the after support bar 42 registers with a transverse slot 74 between the floor 34 and the floor extension 36, allowing transverse movement of the support bar 42 while restricting any fore and aft shift thereof. The lower, rear drive cable 69 then extends toward the left lateral wall 62 and after following a complementary drive cable and pulley arrangement, terminates at the clamp 65 attached to the main drive cable 53 (see FIG. 4).

A lower, front drive cable 76 extends rearwardly from the clamp 58, around the dual pulley 66, and then over direction changing pulleys 70, 77 and 78, being secured along its transverse run to a front foot 79 at the lower end of the forward support bar 41. The floor 34 includes a transverse slot 81 for sliding registration of the forward support bar 41 in a side to side, or transverse fashion.

It will be appreciated that the rollers 43 in rolling engagement with the channels 44, and the forward and after support bars 41 and 42 in sliding registration with respective slots 81 and 74, ensure accurate fore and aft alignment of the press wall 39. It is also apparent that the application of concurrent force by the drive 53, 64, 69, and 76, at their respective points of attachment to the press wall 39, further will maintain the wall's longitudinal alignment as it is transversely translated within the housing 12.

Gaining access through either of the entry doors 75 to the hydraulic controls (not shown), the operator initially actuates the ram 47 to urge the drive arm 48 towards the lateral sheave 51, as can be seen in FIG. 2. This places the press wall 39 into an extreme lateral position, adjacent the right lateral wall 60, for loading the animal. As the horse approaches the rear of housing 12, a single wide and roomy compartment is presented. The appearance of a large compartment instills confidence in the horse, and the additional room provided allows the operator access for securing the animal. A transverse barricade 82, including forwardly diverging wings 83, provides a forward confining wall for the loaded horse (see FIG. 4).

Foam pads 84 are attached to the right and left walls 60 and 62, to both sides of the press wall 39, and to the rear doors 38, as shown in FIGS. 2, 3 and 4. The pads 84 protect the horse from injury while confined within the housing 12.

The operator again actuates the ram 47 to draw the arm 48 and the central sheave 52 towards the lateral sheave 49. The main drive cable 53 and interconnected drive cables 64, 69, and 76 reverse direction to shift the press wall 39 slowly towards the animal for confinement as shown in FIG. 4. The sheave and cable arrangement of the drive assembly 46 is such that a two foot shift of the position of the central sheave 52, effects a six foot movement of the drive cables 50 and the press wall 39. This six foot range of selective position for the wall 39 has proved very satisfactory for loading and confining horses in the manner contemplated herein.

The hydraulic controls afford a nice degree of control over the rate of translation and the determination of precise placement of the press wall 39. A slow rate of translation ensures that the horse will not panic as the wall 39 approaches and that the lateral confinement of the horse is snug without being excessive.

If the horse is too disabled to enter the housing 12 under its own power, a different loading method is employed. A fore positioned winch 86 and associated cable 87 are used to drag the horse into the housing 12 upon a "flexible pallet" (not shown). The "flexible pallet" is simply a large sheet of canvas, or other durable but flexible material, upon which the disabled horse is placed. The cable 87 is passed through the aperture 88 in the barricade 82, and attached to the fore portion of the "flexible pallet".

With the press wall 39 in an extreme lateral position, the operator then actuates the winch 86, which drags the "flexible pallet" and the disabled horse up the inclined floor extension 36 and floor 34 into the housing 12. The press wall 39 is not used in this particular situation, of course.

After the horse has been loaded, the rear doors 38 are closed, and the rams 33 are actuated to raise the housing 12 into a level position for transport. During transit, the press wall 39 confines and supports the horse, ensuring that a new or aggravated injury will not occur.

Following transport, the housing 12 is again lowered in the manner previously described, and the press wall 39 is actuated to withdraw fully from the horse. At this juncture, the horse can exit either rearwardly through the rear doors 38 or forwardly through one of the lateral doors 89 (FIGS. 1 and 3).

Each lateral door 89 has an upper window section 91 and a lower, ramp section 92. As shown most clearly in FIG. 1, the window section 91 is hingeably mounted about a vertical axis and the ramp section 92 is hingeably mounted about a horizontal axis. In other words, to open the door 89, the bolt 93 is raised and the window section 91 is swung rearwardly. Then the latch mechanism 94 is released, and the ramp section 92 is lowered to the ground (see FIG. 4). The angle portion 96 of the ramp 92 is so designed that with the housing 12 in a lowered position, the portion 96 is in complete contact with the ground.

By lowering the housing 12 for forward unloading of the horse, the vertical drop from the floor 34 to the ground at the position of the lateral door 89 is reduced from the normal height of 18 inches to approximately 9 inches. As a consequence, the inclination of the ramp section 92, in its lowered position, is reduced commensurately, facilitating safe unloading of the horse.

I have presented, therefore, a horse ambulance in accordance with the design objectives of safe and relatively easy transport of sick or injured horses within a mobile housing of simplified construction.

I claim:

1. An equine ambulance comprising:

a. an elongated chassis extending from a forward end to an after end;

b. a housing carried on said chassis including a floor and lateral fore and aft side walls;

c. ground engaging wheel means for supporting said after end of said chassis;

d. a vertical fore and aft press wall located within said housing;

e. cable means for moving said press wall between a first position adjacent one of said side walls to a second position removed from either of said side walls;

f. door means on the perimeter of said housing for providing ingress and egress to an equine;

g. means for controlling the movement of said cable means so that said press wall can be urged gently but firmly against an equine in standing position between said press wall and the side wall adjacent the equine as said press wall is moved from said first position toward said second position; and, h. means for coupling said forward end of said chassis to a tractor for transporting said ambulance.

2. An equine ambulance as in claim 1 wherein said ground engaging wheel means includes a pair of levers journaled at their proximal ends on opposite sides of said chassis for movement in respective vertical planes between a first attitude and a second attitude; a pair of wheels rotatably mounted on the distal ends of said levers; and a pair of rams operatively connected to said levers for moving said levers in unison between said first attitude in which said wheels support said after end of said chassis at an elevation well above ground level and said second attitude in which said wheels support said after end of said chassis at substantially ground level.

3. An equine ambulance as in claim 2 wherein said cable means includes an elongated drive arm having one end pivotally mounted on the forward end portion of said chassis; a central sheave rotatably mounted on the other end of said drive arm; a plurality of pulleys interposed between said central sheave and said press wall; a plurality of cables trained about said pulleys and said central sheave and attached to said press wall; and means interconnected to said drive arm for moving said central sheave laterally between a first location in which the tension imposed by said central sheave on said cables is effective to move said press wall into said first position and a second location in which the tension on said cables is effective to move said press wall into said second position.

4. An equine ambulance as in claim 3 in which said press wall includes a vertical support bar mounted on the forward end thereof, and a vertical support bar mounted on the after end thereof; a pair of spaced, parallel, transverse channels spanning said side walls of said housing at the height of the upper ends of said support bars; roller means on the upper ends of said support bars for movably engaging the respective one of said channels; and a pair of transverse guide slots in said floor extending between said side walls of said housing vertically below the respective ones of said transverse channels, the lower ends of said support bars protruding downwardly into said quick slots for sliding engagement with the walls thereof.

5. An equine ambulance as in claim 4 in which said cable means further includes means for attaching said cables to said upper ends and said lower ends of said support bars for simultaneous movement thereof as said central sheave is moved between said first location and said second location.

6. An equine ambulance as in claim 1 including fifth wheel means for supporting said forward end of said chassis for relative rotation between said chassis and said coupling means about a vertical axis.

7. An equine ambulance as in claim 6 further including means for mounting said forward end of said chassis on said coupling means for relative rotation about a horizontal fore and aft axis.

8. An equine ambulance as in claim 2 wherein the after edges of said side walls are inclined rearwardly and downwardly at a predetermined angle, and wherein said door means includes at least one rear door hingeably mounted on said predetermined angle being substantially equal to the slope of said chassis in said second attitude to permit said after door to swing open about its hinge axis without impinging upon the ground when said chassis is in said second attitude.

9. An equine ambulance as in claim 2 wherein said door means includes at least one laterally opening side door in one of said side walls, said side door being hinged at the bottom to provide in open position a planar ramp, said side door being movable between a first vertical position, substantially coplanar with said one of said side walls, to a second inclined position wherein the upper edge of said side door is in contact with the ground; and further including latch means for securing said side door in said first position.

10. An equine ambulance as in claim 9 wherein said upper edge of said side door is sloped downwardly and rearwardly at a preselected angle, the slope angle of said upper edge being substantially equal to the slope of said chassis in said second attitude, thereby allowing said sloped upper edge of said side door completely to engage the ground when said chassis is in said second attitude.

* * * * *